US 6,901,081 B1

United States Patent
Ludwig

(10) Patent No.: US 6,901,081 B1
(45) Date of Patent: May 31, 2005

(54) METHOD AND DEVICE FOR DETERMINING A TIME-PARAMETER

(75) Inventor: Reiner Ludwig, Düren (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 986 days.

(21) Appl. No.: 09/628,660

(22) Filed: Jul. 28, 2000

(30) Foreign Application Priority Data

Aug. 17, 1999 (EP) .............................................. 99116214

(51) Int. Cl.$^7$ ................................................. H04J 3/06
(52) U.S. Cl. ...................... 370/519; 370/252; 714/749
(58) Field of Search ................................. 370/519, 508, 370/503, 389, 252; 714/748, 749, 750, 751

(56) References Cited

U.S. PATENT DOCUMENTS 5,699,511 A * 12/1997 Porcaro et al. ............... 714/55
6,405,337 B1 * 6/2002 Grohn et al. ................ 714/749
6,473,399 B1 * 10/2002 Johansson et al. .......... 370/229

OTHER PUBLICATIONS

Stevens, "TCP/IP Illustrated, vol. 1, The Protocols", Section 21.3, Addison Wesley 1994, pp. 299–301.
RFC 793, "Transmission Control Protocol, DARPA Internet Program Protocol Specification", Sep. 1991.
DeSimone et al, "Throughput Performance of Transport–Layer Protocols Over Wireless LANs", Proceedings of the Global Telecommunications Conference (Globecom), U.S., New York, IEEE, vol. —, 1993, pp. 542–549.

Tanenbaum, "Computer Networks", Prentice–Hall International, Upper Saddle River, New Jersey, 1996, pp. 539–541.

* cited by examiner

*Primary Examiner*—Steven Nguyen
*Assistant Examiner*—Thien Tran
(74) *Attorney, Agent, or Firm*—Nixon & Vanderhye, P.C.

(57) ABSTRACT

A method and device for determining a parameter (RTO) associated with a retransmission time-out feature in a data unit transmitter implementing a protocol (TCP) that provides an acknowledgment feature and a retransmission time-out feature, where according to one aspect decreasing values of the round trip time (RTT) are treated differently with respect to their influence on a mean deviation parameter (RTTVAR) than increasing values of the round trip time, where according to another aspect weight values (g, h, w) used in the determination of the parameter (RTO) are chosen such that at least one of them is time variable, and where according to a further aspect the parameter (RTO) is also calculated on the basis of a value (SR) indicative of the number of spurious time-outs in the communication.

45 Claims, 3 Drawing Sheets

METHOD AND DEVICE FOR DETERMINING A TIME-PARAMETER

BACKGROUND OF THE INVENTION

The present invention relates to a method and device for determining a parameter associated with a retransmission time-out feature in a data unit transmitter.

Generally, in the field of communication one distinguishes between circuit-switched connections and data unit switched connections. In a data unit switched connection, an amount of data to be sent is divided into data units, and these data units are sent in accordance with a protocol governing the communication. It may noted that the data units receive different names in the context of different protocols, such as packets, frames, etc., where the term "data unit" shall be used generically for the purpose of the following description.

In order to ensure the reliable transmission of data, many protocols provide the feature of data unit retransmission. More specifically, data unit retransmission means that the correct receipt of a data unit by the receiver in a communication is acknowledged with an appropriate acknowledgment message that the receiver sends back to the sender. Once an acknowledgment has been received by the sender, it can appropriately continue sending further data units, or if no acknowledgment or a non-acknowledgment message is received, then the data unit that was not correctly received by the receiver can be retransmitted.

A feature that typically accompanies data unit retransmission is that of a retransmission time-out. This feature means that the sender in a communication will only wait for a predetermined period of time for an acknowledgment message, namely the retransmission time-out period. After this time has passed without receipt of an acknowledgment, the corresponding data unit is automatically retransmitted. This feature ensures that if a data unit is lost, then the lost data unit will automatically be retransmitted after the above-mentioned time-out period.

An example of a protocol that provides a retransmission and retransmission time-out feature is the so-called transmission control protocol (TCP), which is part of the well known TCP/IP protocol suite. In a general way, it is clear that the time-out period should be determined depending on the so-called round trip time RTT, i.e. the time that passes between the sending of a data unit and the receipt of an acknowledgment for said data unit.

$$\text{Time-Out} = f(RTT) \tag{1}$$

Namely, if a connection is "distant" (i.e. long RTT), then the time-out period must be set longer than for a "close" connection (i.e. short RTT). In this context, it is also clear that the time-out period should be set as long as necessary and as short as possible, because a time-out period that is set too long leads to unnecessary delays in the transmission.

The measured values of RTT may vary strongly over short periods of time, due to a plurality of factors, such as traffic conditions on the network transporting the data units, delayed acknowledgment mechanisms, etc. In order to overcome this problem, it was suggested to introduce a smoothed estimator for the roundtrip time. This is explained e.g. in "TCP/IP Illustrated, Volume 1" The Protocols" by W. Richard Stevens, Section 21.3, Addison Wesley 1994. A first method of determining an RTT estimator uses the following equation $$SRTT \leftarrow \alpha \cdot SRTT + (1-\alpha) \cdot RTT \tag{2}$$

where SRTT represents the smoothed estimator, RTT represents the momentarily measured round-trip time value, and $\alpha$ is a weight or smoothening factor having a recommended value of 0.9. The smoothed estimator SRTT is updated every time a new measurement of RTT is made. The value 0.9 means that 90% of each new estimate is from the previous estimate, and 10% is from the new measurement. RFC 793 (RFC=Request for Comments) recommended setting the so-called retransmission time-out value RTO as $$RTO = SRTT \cdot \beta \tag{3}$$

where RTO is the specific term used in connection with TCP for the above described time-out period, and $\beta$ is a further weight factor, also referred to as a delay variance factor, with a recommended value of 2.

The above described approach to the calculation of RTO has a problem in that it cannot keep up with wide fluctuations in the RTT. This leads to unnecessary retransmissions that deteriorate the conditions in a network. An improvement was therefore suggested, which not only takes the mean value into account but also attempts to keep track of the standard deviation. It is mentioned in the above book by Stevens that the calculation of the standard deviation would be preferred, but this would require the calculation of squares and a square root, which is preferably avoided. This leads to the following approach:

$$\Delta = RTT - SRTT \tag{4}$$

$$SRTT \leftarrow SRTT + g \cdot \Delta \tag{5}$$

$$RTTVAR \leftarrow RTTVAR + h \cdot (|\Delta| - RTTVAR) \tag{6}$$

$$RTO = SRTT + 4 \cdot RTTVAR \tag{7}$$

where RTT again represents the measured round-trip time value, SRTT the smoothed round-trip time estimator, RTT-VAR the estimator for the mean deviation, RTO the retransmission time-out value, g a first weight factor, and h a second weight factor. These weight factors g and h are also referred to as gains, and the value of g is set to 0,125 whereas the value of h is set to 0,25.

The above described approach of equations (4) to (7) has been in place for over ten years.

OBJECT OF THE INVENTION

The object of the present invention is to provide an improved system of data transmission for a data unit transmitter implementing a protocol that provides a retransmission time-out feature.

SUMMARY OF THE INVENTION

This object is solved by making the determination of a parameter associated with the retransmission time-out feature (e.g. RTO) more flexible and more adaptive.

According to a first aspect described in claims 1 and 33, the calculation of a mean deviation value (e.g. RTTVAR above) is performed such that the contribution of the measured round-trip time value (e.g. RTT above) to said mean deviation value is different if the measured round-trip time value is smaller than a threshold that is determined on the basis of the stored smoothed round-trip time value (SRTT above), than if the measured round-trip time value is larger than said threshold.

According to a preferred embodiment, this threshold is equal to the value of the smoothed round-trip time value. In other words, for the above example of equations (4) to (7) this preferred embodiment means that RTTVAR is calculated differently for negative and positive values of A. In this way, it can be avoided that a decreasing value of the measured round-trip time will lead to an increase in the retransmission time-out parameter. More specifically, as shall be explained in detail in the description of preferred embodiments, the fact that above equation (6) incorporates the absolute value of A, means that a decreasing value of RTT (RTT<SRTT) has the same impact on the value of RTTVAR than an increasing value of RTT (RTT>SRTT). As a consequence, a decreasing value of RTT has the effect of increasing RTO, if the factor 4·RTTVAR outweighs the factor of SRTT in above equation (7). This absolutely undesired effect, which was recognized by the present inventor, can be avoided by the above described general method of claim 1.

In accordance with a second aspect of the present invention described in claims 11 and 34, the weight factors (e.g. g, h and the specific factor 4 before RTTVAR in equation (7)) are made variable over time. This feature makes the determination of the time-out parameter (e.g. RTO above) much more flexible with respect to the changing situation in the network carrying the communication. In accordance with a preferred embodiment of this second aspect, the weight values are made dependent on the number of data units "in flight", i.e. the number of data units that were sent but not yet acknowledged at any point in time (also referred to as the number of outstanding data units).

In accordance with a third aspect of the present invention described in claims 17 and 35, the determination of the time-out parameter (e.g RTO) is done such that this parameter is also calculated on the basis of a value indicative of the number of spurious time-outs that occur in the communication between a given sender and receiver. Spurious time-outs are time-outs caused by an excessive delay on the link, and not by an actual loss of data units. The advantage of this is that the implication given by spurious time-outs, namely that the time-out period is too short, can be used as a basis for calculating a more conservative (i.e. longer) time-out period.

The three above described aspects can preferably be combined in any appropriate way. Such a combination is also referred to as an Eifel retransmission timer. Advantageous embodiments of the invention are described in the subclaims.

BRIEF DESCRIPTION OF FIGURES

A more complete understanding of the present invention can be gathered from the following detailed description of preferred embodiments, which make reference to the figures, in which.

DETAILED DESCRIPTION OF PREFERRED EMBODIMENTS

The following description shall be given in the context of an application to TCP. It should however be noticed that this is only a preferred example, and that the present invention may be applied to any transmission protocol that provides retransmission and retransmission time-out.

According to a first aspect of the invention, when the value of the mean deviation value RTTVAR is updated, the contribution of the measured round trip time value RTT to the updated mean deviation value RTTVAR is different if the measured round trip time value RTT is smaller than a predetermined threshold TH that is determined on the basis of the stored smoothed round trip time value SRTT(old), than if the measured round trip time value RTT is larger than the predetermined threshold TH.

According to a first embodiment of the invention, the threshold TH is equal to the stored value of SRTT and the calculation or updating of parameter RTTVAR as shown in above equation (6) is modified such that $$\text{RTTVAR} \leftarrow \begin{cases} \text{RTTVAR} + h \cdot (\Delta - \text{RTTVAR}) & \text{if } \Delta > 0 \\ \text{RTTVAR} & \text{if } \Delta < 0 \end{cases} \quad (8.1)$$

The value $\Delta=0$ may be assigned to either the upper or lower alternative in equation (8.1), but it is preferable that it be assigned to the upper alternative, in order to ensure that RTTVAR decays over time if RTT becomes constant.

As can be seen, the negative variations of RTT, i.e. when RTT is smaller than SRTT, are filtered out. In this way, the disadvantageous impact of taking the absolute value of $\Delta$ in equation (6) is obviated. This shall become clearer in connection with the following detailed description of FIG. 1.

Figure 1:
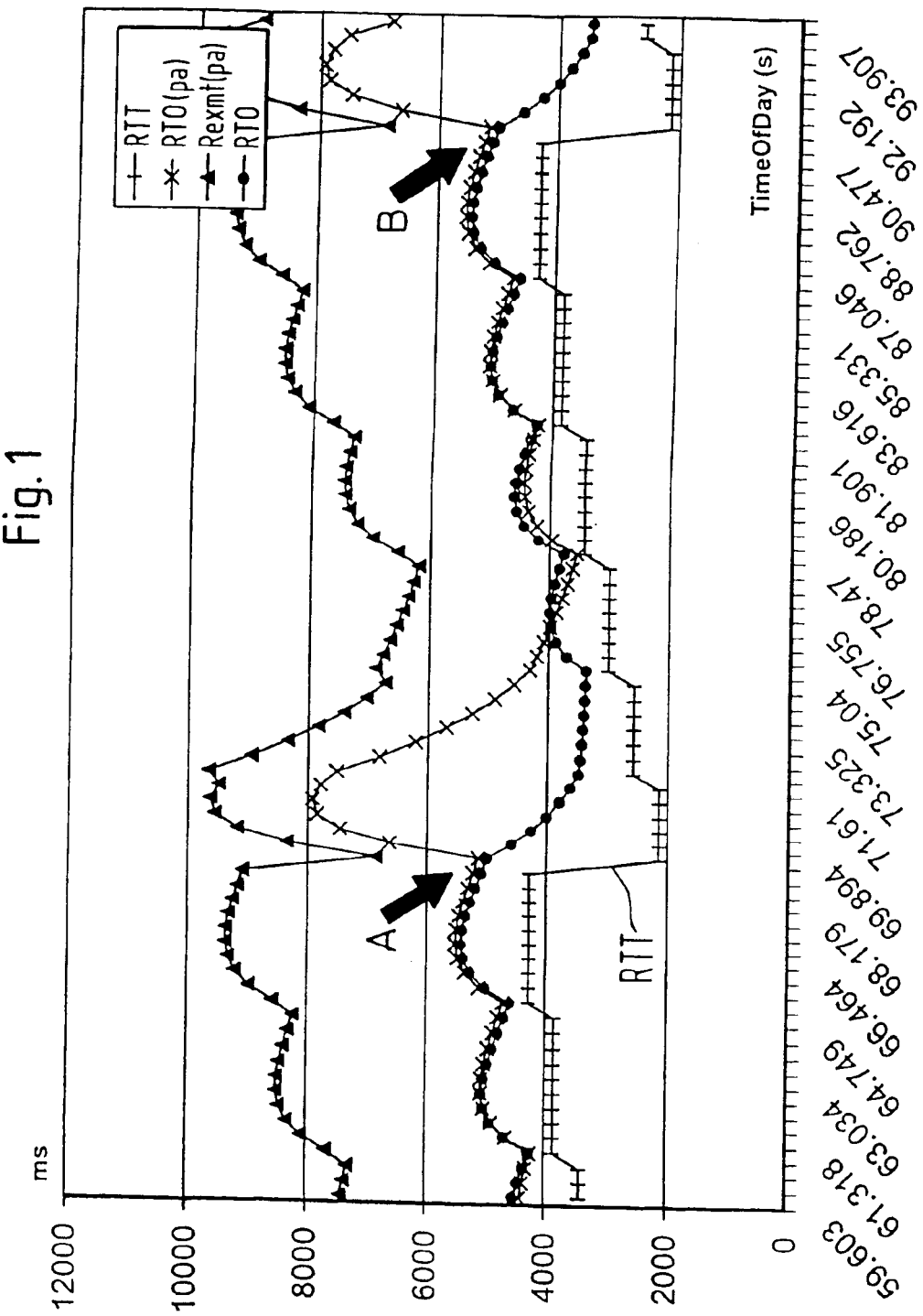
FIG. 1 is a graph showing various parameters associated with the retransmission time-out feature in the course of time, for a TCP steady state.

FIG. 1 shows parameters associated with the retransmission time-out over time. The parameters were measured in TCP steady state, i.e. the connection between the given sender and receiver had a link all to itself. The graph at the bottom of the figure that changes in steps, describes the measured values of the round-trip time RTT. The symbols for RTO(pa) stand for the retransmission time-out parameter as calculated with prior art equations (4) to (7). The values Rexmt(pa) relate to the retransmission timer as it is typically implemented. This shall be explained briefly.

Theoretically, the retransmission time-out value RTO and the retransmission timer Rexmt should be identical. However, as recognized by the present inventor, the prior art implementations of TCP in fact contain an error that always leads to a difference between RTO and Rexmt. This error is due to the fact that the actual retransmission timer is always started for the oldest outstanding (i.e. not acknowledged) data unit. However, due to the use of cumulative or delayed acknowledgments, it will typically not be known at the time of sending a specific data unit that this specific data unit will soon become the oldest outstanding data unit. Only after an acknowledgment for all data units up to said specific data units has been received, is it known that this specific data unit is the oldest outstanding one. All practical implementations of TCP always start the retransmission timer only when having received this acknowledgment for all data units up to said specified data unit. Consequently, there is always a delay δ between the sending of the data unit and the receipt of the acknowledgment message for all data units up to said data unit, which leads to the retransmission timer Rexmt being larger than the retransmission time-out value RTO, namely Rexmt=RTO+δ.

The consequence of this effect is that the retransmission time-out is always too conservative, i.e. too long.

Returning to FIG. 1, this difference between RTO(pa) and Rexmt(pa) is apparent. Furthermore, the figure also shows values of RTO calculated in accordance with the invention indicated above in equation (8.1).

As can be seen from the thick arrows A and B, when the measured round-trip time values RTT decrease sharply, then this leads to a sharp increase of RTO(pa). This is highly undesirable, as the retransmission time-out value should have the tendency to follow the round-trip time. As can be seen, this is clearly achieved by the values of RTO in accordance with the invention, which are calculated on the basis of a mean deviation value RTTVAR calculated in accordance with above equation (8.1). As can be seen, the values of RTO determined in accordance with the invention follow the tendency of RTT, and always lie close and above RTT, precisely as this is desired.

Figure 2:
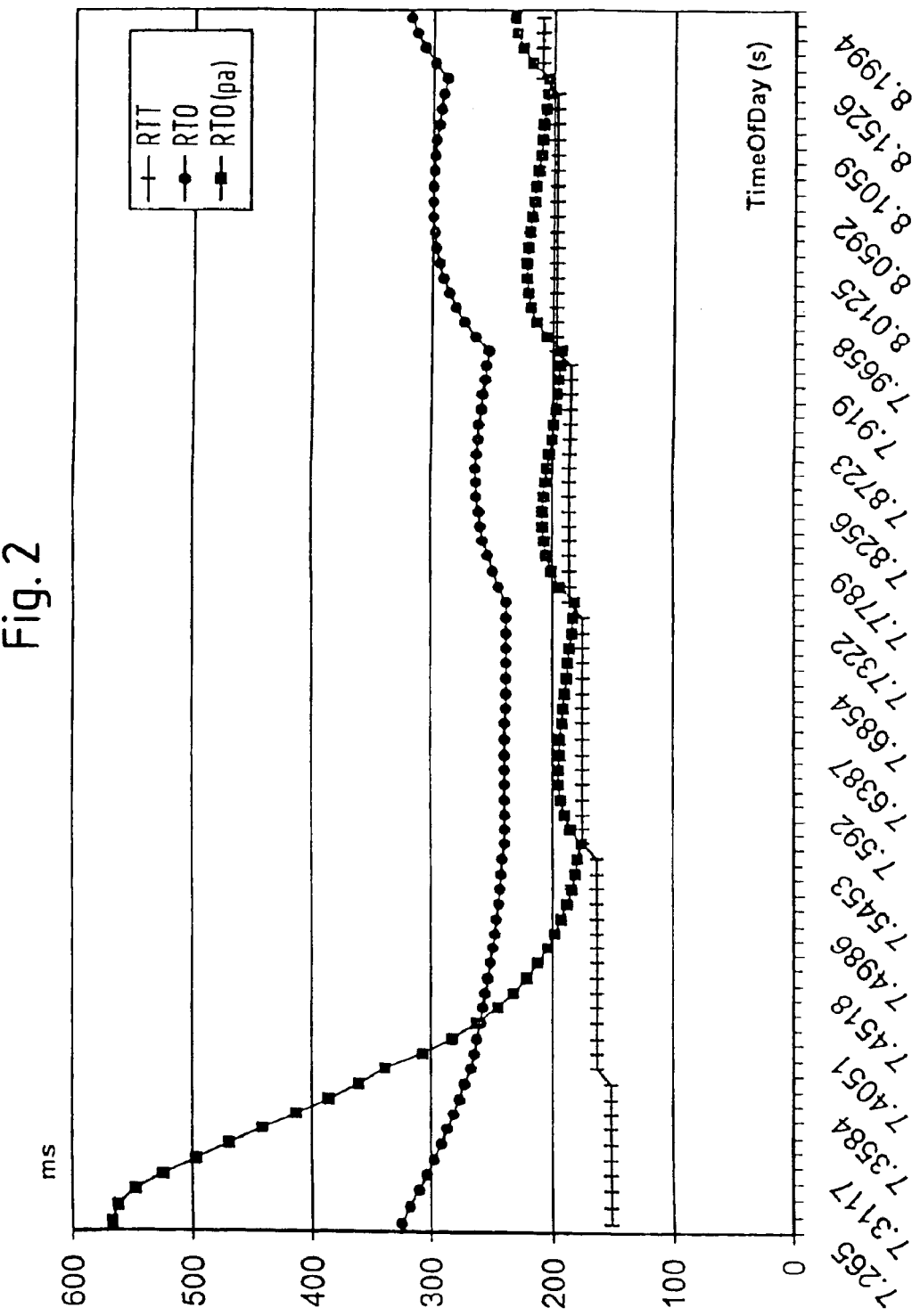
FIG. 2 shows an enlarged section of the graph of FIG. 1.

FIG. 2 shows an enlarged section of FIG. 1, where only RTT, RTO(pa) and RTO are shown. As can be seen, the value of RTO as calculated in accordance with the invention has a more stable graph than the RTO(pa) calculated in accordance with the prior art.

In the above equation (8.1), the threshold TH used to determine which contribution RTT should make to the mean deviation RTTVAR was the stored smoothed round trip time value SRTT. However, the invention is not restricted thereto, as the threshold TH can in general be any appropriate value determined on the basis of SRTT, such as for example TH(SRTT)=SRTT+const or TH(SRTT)=SRTT-const, where const stands for any suitable constant value, i.e. a threshold that lies somewhat above or below the stored value of SRTT. In general, TH can be any suitable function of SRTT.

This therefore leads to a more general equation (8.2):

$$RTTVAR \leftarrow \begin{cases} RTTVAR + h \cdot (\Delta - RTTVAR) \text{ if } RTT > TH(SRTT) \\ RTTVAR \text{ if } RTT < TH(SRTT) \end{cases} \quad (8.2)$$

Again, RTT=TH(SRTT) is preferably assigned to the upper alternative.

In the above equations (8.1) and (8.2), two respective alternatives for calculating RTTVAR are given. It is however equally well possible that a larger number of alternatives be given, depending not only on the values of the measured RTT and the stored value of SRTT, but also on the stored value of RTTVAR. Namely, a preferred variation of equation (8.1) is given in following equation (8.3), which is written in pseudo code for reasons of simplicity and clarity.

IF $\Delta \geq 0$ THEN  (8.3)

IF $\Delta - RTTVAR < 0$ THEN $RTTVAR \leftarrow RTTVAR + h^2 \cdot (\Delta - RTTVAR)$

ELSE $RTTVAR \leftarrow RTTVAR + h \cdot (\Delta - RTTVAR)$

ELSE $RTTVAR \leftarrow RTTVAR$

In other words, for the case that RTT is above the threshold (in this case TH=SRTT; i.e. Δ=0), two sub-cases are considered. If h is a value between 0 and 1 or a function restricted to this range (which will generally be the case), then the effect of above equation (8.3) is a type of "shock absorber" characteristic, namely the increase of RTO (RTO being calculated in any suitable way, as shall be explained in further on) in response to an increase in RTT is faster then the decrease of RTO in response to a decrease of RTT.

Finally, as was the case for equation (8.1), equation (8.3) may also be generalized to threshold values other than TH=SRTT (Δ=0)

TH = SRTT (Δ = 0):  (8.4)

IF RTT ≥ TH(SRTT) THEN

IF $\Delta - RTTVAR < 0$ THEN $RTTVAR \leftarrow RTTVAR + h^2 \cdot (\Delta - RTTVAR)$

ELSE $RTTVAR \leftarrow RTTVAR + h \cdot (\Delta - RTTVAR)$

ELSE $RTTVAR \leftarrow RTTVAR$

In above equations (8.1) to (8.4) the weight parameter h can be chosen as a constant (h=const.) or a variable value.

Preferably, it is chosen as being variable over time (h=h(t)). More preferably, it is chosen to be associated with the number N of outstanding data units at the given time. The momentary value h(t) can e.g. be chosen as being 1/N(t), where N(t) represents the number of data units that were sent but not acknowledged up to the point in time t.

Although it is possible to directly associate h with N, it is preferable to use a moving average or smoothed value of N (similar to SRTT being a smoothed average value of the "noisy" RTT values). In other words, a moving average value SN of the number N of outstanding data units can be used, which can e.g. be determined as $SN \leftarrow SN + m \cdot N$ where m is an appropriate weight factor.

As another possibility of finding a value indicative of the number of outstanding data units, the weight h can be associated with the so-called slow start threshold ssthresh, e.g. known from TCP, see above mentioned book by Stevens, Chapter 21.6, because ssthresh can in fact be regarded as a smoothed average for the number of outstanding data units.

The slow start threshold ssthresh is conventionally used in connection with congestion avoidance. Congestion avoidance is used with window based flow control, and has two primary parameters, namely the slow start threshold and the so-called congestion window cwnd. The congestion avoidance routine basically works in the following manner:

the send window is never larger than the minimum of the congestion window and the receiver's advertised window;

when congestion occurs (e.g. indicated by a time-out or the receipt of a duplicate acknowledgment), one half (or some other appropriate fraction) of the momentary send window size is saved as ssthresh, and in the event of a time-out, the congestion window is reset to one segment;

when new data is acknowledged, the cwnd is increased, depending on the relation between cwnd and ssthresh, namely if cwnd is smaller or equal to ssthresh, then cwnd is incremented by one segment every time an acknowledgment is received (this routine is called slow start), and if cwnd is larger than ssthresh, then cwnd is incremented by 1/cwnd each time an acknowledgment is received (this is the actual congestion avoidance).

Slow start leads to an exponential increase in window size, whereas congestion avoidance only leads to a linear increase.

Returning to the determination of h, in general the weight h is chosen as a function of the value indicative of the number of outstanding data units, i.e. as a function of N, SN or sstresh. It may be noted that these are only examples, and any value indicative (be it directly or indirectly) of the number of outstanding data units is suitable. It is however preferable to use the value of ssthresh, which is typically already available in a normal TCP implementation, such that no separate determination routine is necessary.

According to a preferred embodiment, the weight h is then chosen as the inverse of a function of ssthresh, namely as h=1/(ssthresh+1). Although sstresh is defined in byte, the value of sstresh is used in terms of segments in the present application, i.e. ssthresh=1 means that the size of sstresh equals one segment, ssthresh=2 means that the size of sstresh equals two segments, etc. Preferably the size of sstresh is measured in terms of the maximum segment size MSS, which is a parameter that is set or negotiated during the initial connection phase. Alternatively, an arbitrary fixed value can be used as a segment reference, such as 1024 byte.

The above equations (8.1) to (8.4), together with the various possibilities for h, can be combined with above equations (4), (5) and (7) for the determination of RTO. Preferably, however, equations (8.1) to (8.4) are combined with the following equations (9) and (10):

$$\text{SRTT} \leftarrow \text{SRTT} + g(t) \cdot \Delta \tag{9}$$

$$RTO = SRTT + w(t) \cdot RTTVAR \tag{10}$$

where g(t) and w(t) represent time variable weights.

According to a preferred embodiment, the three weights g(t), h(t) and w(t) are associated with one another in such a way that h=g and w=1/g.

In a general way, g and/or w can be chosen as being associated with the number N of outstanding data units, as explained above in connection with the weight h, i.e. g and/or w can also be chosen as functions of a value indicative of the number N of outstanding data units, such as N, SN, or ssthresh.

More preferably, the above two features are combined, namely all three weights g, h and w are chosen as being associated with N in a specific way, namely with an appropriately selectable function of F (where F is a function of N, SN, sstresh or any other appropriate value indicative of the number of outstanding data units):

$$g=1/F \; ; \; h=1/F; \; w=F.$$

As an example, F(N) can be chosen as F(N)=N+1, such that $$g=1/(N+1); \; h=1/(N+1); \; w=N+1.$$

It is equally well possible to choose the weights on the basis of the smoothed average SN or the slow start threshold ssthresh, such that $$g=1/F(\text{ssthresh}); \; h=1/F(\text{ssthresh}); \; w=F(\text{ssthresh}), \text{ for example:}$$

$$g=1/(\text{ssthresh}+1); \; h=1/(\text{ssthresh}+1); \; w=\text{ssthresh}+1.$$

Naturally, the combinations can also be such that only one of weights g, h and w is time variable, or that two of these three weights are time variable, the respectively others always being constant.

Figure 3:
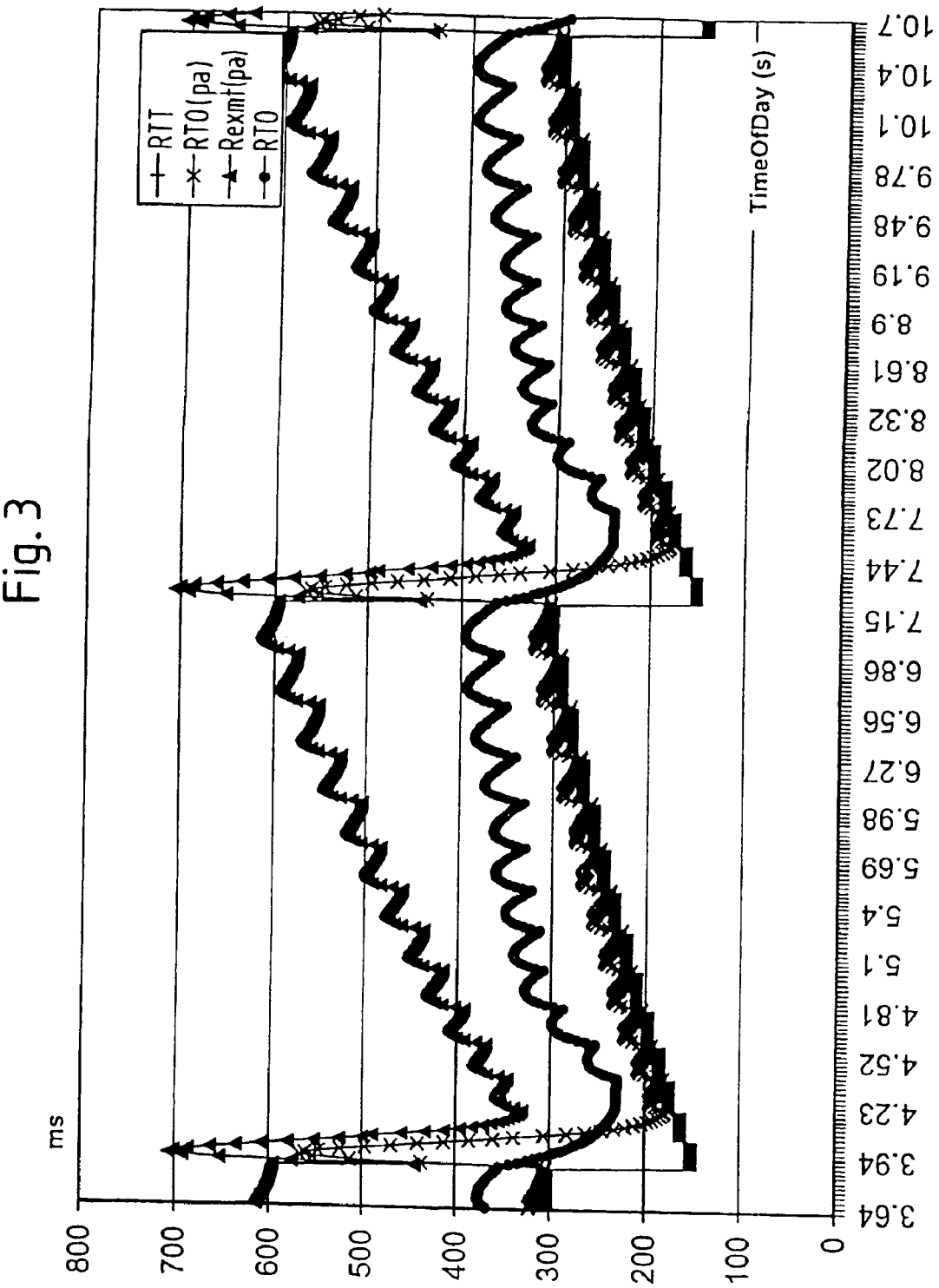
FIG. 3 shows another graph of retransmission time-out parameters over time.

The positive effects of choosing the weights in the above way can be seen in FIG. 3, which again shows the measured round-trip time values RTT, the calculated retransmission time-out value of the prior art RTO(pa), the retransmission timer of the prior art Rexmt(pa) and the retransmission time-out value RTO calculated in accordance with above equations (8), (9) and (10) using g=1/(ssthresh+1), h=1/(sstresh+1) and w=ssthresh+1. As can be seen, the problem of using constant weight parameters can lead to the retransmission time-out value RTO(pa) too closely following the round-trip time value RTT, such that in fact there is no-smoothing or averaging effect. This leads to a destabilized flow control procedure. On the other hand, as can be seen from the graph representing RTO of the invention, the retransmission time-out value of the invention follows the tendency of RTT, but remains above RTT. In other words, by using the time variable weight factors g, h and w, it is possible to avoid that the value RTO "falls into" the value of RTT, which could lead to spurious time-outs, which should generally be avoided.

Although the above embodiment was described in connection with equations (8.1) to (8.4), it is also possible to introduce a time variable weight factor h(t), such as e.g. h=1/(N(t)+1) or h=1/(ssthresh+1) in prior art equation (6).

Naturally it is also possible to combine equation (10) using a time variable weight w(t) with equations (5) and (6) using fixed weights g, h, or to combine equation (9) using a time variable weight g(t) with equations (5) and (7) using fixed weights. In a general way, the second aspect of the present invention is to choose at least one of said three weights as a time dependent parameter, preferably as being associated with the number of outstanding or unacknowledged data units.

According to a third aspect of the present invention, the determination of the retransmission time-out value RTO is modified such that $$RTO \leftarrow (SRTT + w \cdot RTTVAR) \cdot \Phi(SPTO) \tag{11}$$

where $\Phi(SPTO)$ represents a function associated with the number SPTO of spurious time-outs. Spurious time-outs are such time-outs that are caused by an excessive delay along the link between a sender and a receiver, and not by the loss of a data unit, in other words, had the RTO been longer, no time-out would have occurred, because the acknowledgment would have been received, if the sender had only waited long enough.

As an example, the function $\Phi(SPTO)$ in equation (11) can be chosen as $$\Phi(SPTO) = 1 + f \cdot (n(SPTO)/n) \tag{12}$$

where n(SPTO) represents the number of spurious data unit retransmissions caused by spurious time-outs during a predetermined interval, n represents the total number of data unit transmissions during said predetermined interval, and f is a multiplication parameter. f can be chosen as having any appropriate value, but it has been found that a value of 50 or larger is especially effective.

This predetermined time interval may be set in any desired way, i.e. to a fixed value such as the maximum segment lifetime (MSL) which is e.g. defined as 2 minutes, or to a value dependent on the momentary communication, such as the total communication time for the momentary communication from the start of said communication to the present.

It may be noted that one spurious time-out can lead to more than one spurious retransmission. For example, if 100 data units are sent, and there were two spurious time-outs, the first of which led to one retransmission and the second of which led to two retransmissions, then SR assumes the value 3/100.

According to a preferred embodiment, O(SPTO) is chosen as a smoothed value SR that is defined in the following way (again pseudo code is chosen for simplicity):

IF "spurious time-out" THEN (13)

$\quad$ SR ← MIN{NC, SR + 0.5·(1 − SR)}

ELSE $\quad$ SR ← SR·(1 − (K/M))

where MIN{x,y} is equal to the minimum of x and y, NC is a whole number larger than 0, i.e. N=1, 2, 3 . . . , K is a rate value with 0≦K<1, and M is a variable that is indicative of the number of data units sent in a cycle. A cycle is a period of time that corresponds to one set of rising steps of RTT as shown in the Figures, see e.g. the rising steps between about 69 s and 92 s in FIG. 1, or between 3.9 s and 7.15 or between 7.15 and 10.6 in FIG. 3. Preferably one again uses a smoothed average of this number, or one determines M on the basis of the slow start threshold sstresh as $M=\phi(ssthresh)$ (14)

φ representing an arbitrary function, and preferably as $M=1.5 \cdot ssthresh^2$ (15)

NC is preferably chosen as 1 or 2, and K preferably lies between 0.01 and 0.1, more preferably at about 0.05.

In other words, each time that an acknowledgment is received, it is determined if this acknowledgment indicates a spurious time-out, in which case the smoothed average SR is updated as shown in the first alternative, and if not, then SR is updated as shown in the second alternative.

As can be seen from equation (11), the multiplication with the factor O(SPTO) progressively makes the RTO (the predictor) more optimistic when spurious time-outs have not occurred for some time, and vice versa makes the RTO more conservative after a spurious time-out has occurred.

The determination of spurious time outs can be done in any desired-way, for example as explained in co-pending European Patent Application 99100274.2, which is herewith incorporated by reference.

More specifically, a spurious time-out is identified by determining that after a given data unit was retransmitted due to a time-out, the received acknowledgment is not in response to the retransmitted data unit, but in response to the data unit that caused the time-out.

One method of determining spurious time-outs can be to have the sender keep a record of the round-trip time RTT associated with the connection between sending and receiving peer. (this is typically done anyway), and especially have the sender keep a record of the shortest RTT found during the communication (also referred to as session) up to the point of time under consideration. Then, if an acknowledgment data unit for a retransmitted data unit is received within a time period that is smaller than a predetermined fraction of said shortest RTT, then the sender determines that this acknowledgment belongs to the original transmission and not the retransmission. This fraction may be set to a fixed value, or may itself be an adaptive parameter. Naturally, it is not necessary that the comparison value multiplied with said fraction is the shortest measured RTT, much rather it is also possible that the sender keeps an average RTT value, such as the above mentioned SRTT, and that this average value is used as a basis for the determination of spurious time-outs. In this sense, the comparison value to be multiplied by said fraction is generally a function of one or more RTT values measured in the course of the connection (i.e. during the session).

Another possibility of determining spurious time-outs is to have the sender add a mark to data units that it sends, where said mark is defined in such a way that it allows to distinguish between an original transmission and a retransmission. Then, the receiver can accordingly mark acknowledgment data units, such that the sender is capable of identifying if an acknowledgment refers to the original transmission or the retransmission. This marking of data units can be done in any desired way. For example, it would in theory be possible to simply designate a single bit in the data units, where a value of 0 would indicate original transmission and a value of 1 a retransmission, or vice versa. In a general sense, a bitstring can be chosen that may also convey some more information. However, in connection with protocols that provide such an option, it is preferred to use the timestamp option. This option is for example well-known for TCP, see the above-mentioned book by W. R. Stevens. In other words, it is preferred to include a timestamp in sent data units, which indicates when the data unit was sent. The receiver can then simply include the same timestamp in the acknowledgment messages, so that the sender has a unique way of identifying the data units to which the acknowledgment refers.

Returning to equation (11), it may be pointed out that the factor Φ(SPTO) is a means to adaptively control the conservativeness of the RTO (the predictor). In other words, the more spurious time-outs occur, the more conservative the RTO and vice versa.

Also, the parameter w shown in figure (11) may be a fixed value or a time variable value, just as with the previous embodiments, and is preferably equal to the above mentioned function F (e.g. F=ssthresh+1) that depends on an appropriate parameter that is indicative of the number of outstanding data units. Naturally, the above embodiment described in connection with equation (11) can be combined with one or more or equations (5), (6), (8.1) to (8.4) or (9) in any desirable way.

Preferably, the determination of RTO in accordance with equation (11) is complemented by the setting of a maximum limit value and a minimum limit value, as shown in the following equation (16):

RTO ← (SRTT + w·RTTVAR)·Φ(SPTO) (16)

RTO = MAX{RTO, RTT + n·TICK}

RTO = MIN{RTO, T$_{const}$} where MAX{x,y} gives the maximum of x and y, and MIN{x,y} gives the minimum of x and y. TICK represents the timer granularity, i.e. the smallest-amount of time that the system can resolve, n is a positive integer, and T$_{const}$ is an upper time limit, such that RTO does not become excessively large. For example, T$_{const}$ can be chosen as 64 sec. The integer n is preferably 1, such the second equation of (16) means that RTO is always determined as at least being larger than RTT by one tick.

The setting of an upper and lower limit for RTO may also be utilized in connection with any of the other embodiments above.

In the following, an embodiment will be described, which the inventor presently considers the best mode, which is a preferred combination of the above aspects. It is also referred to as the Eifel retransmission timer. More specifically, this best mode consists in determining RTO as follows:

$$\Delta = RTT - SRTT \quad (17)$$

$$g = h = 1/w = 1/(ssthresh+1) \quad (18)$$

$$SRTT \leftarrow SRTT + g \cdot \Delta \quad (19)$$

IF $\Delta \geq 0$ THEN (20)

IF $\Delta - RTTVAR < 0$ THEN $RTTVAR \leftarrow RTTVAR + h^2 \cdot (\Delta - RTTVAR)$

ELSE $RTTVAR \leftarrow RTTVAR + h \cdot (\Delta - RTTVAR)$

ELSE $RTTVAR \leftarrow RTTVAR$

IF "spurious time-out" THEN (21)

$SR \leftarrow MIN\{NC, SR + 0.5 \cdot (1 - SR)\}$

ELSE $SR \leftarrow SR \cdot (1 - (K/M))$ $$RTO \leftarrow (SRTT + w \cdot RTTVAR) \cdot \Phi(SPTO) \quad (22)$$

$$RTO = MAX\{RTO, RTT + n \cdot TICK\}$$

$$RTO = MIN\{RTO, T_{const}\}$$

The above parameters and values are all defined in the preceding embodiments, such that a repetition of definitions and preferred values is not necessary.

This series of calculations (17) to (22) is carried out each time that a value of RTT is measured. In other words, the value of RTO is updated for every measurement of RTT.

In all of the above embodiments, the various calculations were based on the measurement of round trip time values RTT. Preferably, these measurements are conducted for every data unit that is sent, in departure from known implementations of TCP, which only time one data unit at a time, so that on average there is only one RTT measurement per RTT. The timing of every data unit sent is preferably done by utilizing the time stamp option, as e.g. defined for TCP in RFC 1323.

As already mentioned initially, the present invention is applicable to any data unit communication system that provides retransmission and time-out, such as e.g. TCP or similar protocols. A preferred application of the present invention is in wireless data unit switched communication systems, in which changes in available bandwidth can be significant, which in turn leads to strong variations in RTT. Examples of such systems are GPRS (General Packet switched Radio System) and UMTS (Universal Mobile Telecommunication System).

Although the present invention has been described in the context of concrete embodiments, these only serve the purpose of explaining the present invention to a person skilled in the art, and are not intended to be restrictive. Much rather, the scope of the present invention is defined by the appended claims.

What is claimed is:

1. A method of determining a parameter associated with a retransmission time-out feature in a data unit transmitter implementing a protocol that provides an acknowledgment feature of sending acknowledgment messages for the correct receipt of data units from the receiver to the sender of a communication, and provides said retransmission time-out feature of retransmitting data units if an acknowledgment does not arrive at the sender within a time-out period, comprising the steps of:

measuring a round trip time value the round trip time being indicative of the time that passes between the sending of a given data unit and the receipt of the acknowledgment corresponding to said given data unit, calculating a new smoothed round trip time value at least on the basis of a stored smoothed round trip time value and said measured round trip time value, calculating a new mean deviation value indicative of the mean deviation of said round trip time values over time, at least on the basis of a stored mean deviation value, said measured round trip time value and said stored smoothed round trip time value, and calculating said parameter at least on the basis of said new smoothed round trip time value said new mean deviation value, where a contribution of said measured round trip time value to said new mean deviation value is different if said measured round trip time value is smaller than a predetermined threshold that is determined on the basis of said stored smoothed round trip time value, than if said measured round trip time value is greater than said predetermined threshold.

2. The method of claim 1, wherein said predetermined threshold is equal to said stored smoothed round trip time value.

3. The method of claim 1, wherein said new mean deviation value is calculated as being equal to or smaller than said stored mean deviation value if said measured round trip time value is smaller than said predetermined threshold.

4. The method of claim 1, wherein said new mean deviation value is calculated as a function of said stored man deviation value said stored smoothed round trip time value, said measured round trip time value, and a weight factor if said measured round trip time value is larger than said predetermined threshold.

5. The method of claim 4, wherein said weight factor is variable over time.

6. The method of claim 5, wherein said new mean deviation value (RTTVAR(new)) is calculated as:

$$RTTVAR(new) = $$
$$RTTVAR(old) + h \cdot ((RTT - SRTT(old)) - RTTVAR(old))$$

if said measured round trip time value (RTT) is greater or equal to said predetermined threshold (TH(SRTT(old))), where RTTVAR(new) represents the new mean deviation value, RTTVAR(old) represents the stored mean deviation value, SRTT(old) represents the stored round trip time value, RTT represents the measured round trip time value, and h represents said weight factor.

7. The method of claim 5, wherein said new mean deviation value (RTTVAR(new)) is calculated as $$RTTVAR(new) = RTTVAR(old) + h \cdot ((RTT - SRTT(old)) - RTTVAR(old))$$

if said measured round trip time value (RET) is greater or equal to said predetermined threshold (TH(SRTT(old))) and $$(RTT-SRTT(old))RTTVAR(old) \geqq 0,$$

and as $$RTTVAR(new) = RTTVAR(old) + h^2 \cdot ((RTT - SRTT(old)) - RTTVAR(old))$$

if said measured round tip time value (RTT) is greater or equal to said predetermined threshold (TH(SRTT(old))) and $$(RTT-SRTT(old))-RTTVAR(old)<0,$$

where RTTVAR(new) represents the new mean deviation value, RTTVAR(old) represents the stored mean deviation value, SRTT(old) represents the stored round trip time value, RTT represents the measured round trip time value, and h represents said weight factor.

8. The method of claim 4, wherein a value of said weight factor at a given time is associated with a value indicative of the number of data units that were sent up to said given time, but that were not acknowledged up to said given time.

9. The method of claim 8, wherein said value indicative of the number of data units that were sent up to said given time, but that were not acknowledged up to said given time, is one of the
number of data units that were sent up to said given time, but that were not acknowledged up to said given time,
a smoothed average of said number of data units that were sent up to said given time, but that were not acknowledged up to said given time, and
the slow start threshold.

10. The method of claim 8, wherein said weight factor is equal to the inverse value of a sum of said value indicative of the number of data units that were sent up to said given time, but that were not acknowledged up to said given time, and one.

11. A method of determining a parameter associated with a retransmission time out feature in a data unit transmitter implementing a protocol that provides an acknowledgment feature of sending acknowledgment messages for the correct receipt of data units from the receiver to the sender of a communication, and provides said retransmission time-out feature of retransmitting data units if an acknowledgment does not arrive at the sender within a time-out period, comprising the steps of:
measuring a round trip time value, the round trip time being indicative of the time that passes between the sending of a given data unit and the receipt of the acknowledgment corresponding to said given data unit,
calculating a new smoothed round trip time value at least on the basis of a stored smoothed round trip time value, said measured round trip time value, and a first weight factor,
calculating a new mean deviation value indicative of the mean deviation of said round trip time values over time, at least on the basis of a stored mean deviation value said measured round trip time value, said stored smoothed round trip time value and a second weight factor (h), and
calculating said parameter at least on the basis of said new smoothed round trip time value said new mean deviation value, and a third weight factor,
where at least one of said first, second and third weight factors is variable over time.

12. The method of claim 11, wherein a value at a given time of said at least one weight factor, is associated with a value indicative of the number of data units that were sent up to said given time, but that were not acknowledged up to said given time.

13. The method of claim 11, wherein said first, second and third weight factor are time dependent, and said first and second weight factor are identical, and said third weight factor is equal to the inverse value of said first weight factor.

14. The method of claim 12, wherein said first weight factor and said second weight factor is equal to an inverse value of a predetermined function of said value indicative of the number of data units that were sent up to said given time, but that were not acknowledged up to said given time, and said third weight factor is equal to said function.

15. The method of claim 14, wherein said predetermined function is the sum of said value indicative of the number of data units that were sent up to said given time, but that were not acknowledged up to said given time, and one.

16. The method of claim 12, wherein said value indicative of the number of data units that were sent up to said given time, but that were not acknowledged up to said given time, is one of the
number (N) of data units that were sent up to said given time, but that were not acknowledged up to said given time,
a smoothed average of said number of data units that were sent up to said given time, but that were not acknowledged up to said given time, and
the slow start threshold.

17. A method of determining a parameter associated with a retransmission time-out feature in a data unit transmitter implementing a protocol that provides an acknowledgment feature of sending acknowledgment messages for the correct receipt of data units from the receiver to the sender of a communication, and provides said retransmission time-out feature of retransmitting data units if an acknowledgment does not arrive at the sender within a time-out period, comprising the steps of;
measuring a round trip time value, the round trip time being indicative of the time that passes between the sending of a given data unit and the receipt of the acknowledgment corresponding to said given data unit,
calculating a new smoothed round trip time value at least on the basis of a stored smoothed round trip time value and said measured round trip time value,
calculating a new mean deviation value indicative of the mean deviation of said round trip time values over time, at least on the basis of a stored mean deviation value, said measured round trip time value and said stored smoothed round trip time value, and
calculating said parameter at least on the basis of said new smoothed round trip time value and said new mean deviation value
where said parameter is also calculated on the basis of a value indicative of the number of spurious time-outs that occurred in said communication between said sender and said receiver.

18. The method of claim 17, wherein said parameter is calculated as a product of a first factor that depends on said new smoothed round trip time value and said new mean deviation value and a second factor that depends on said value indicative of the number of spurious time-outs.

19. The method of claim 17, wherein said value indicative of the number of spurious time-outs is the sum of one and the product of the fraction of the number of data unit retransmissions caused by spurious time-outs divided by the total number of transmitted data units over a predetermined period of time and a multiplication factor.

20. The method of claim 19, wherein said multiplication factor is greater or equal to fifty.

21. The method of claim 17, wherein said value indicative of the number of spurious time-outs is a smoothed average determined on the basis of the number of spurious timeouts.

22. The method of claim 21, wherein said smoothed average (SR) is determined such that when an acknowledgment is received, it is determined if said acknowledgment indicates a spurious time-out, in which case a stored value of said smoothed average (SR) is updated as the minimum of an integer constant (N) and $$SR+wsr \cdot (1-SR),$$

where SR represents the stored value of said smoothed average, and war represents a weight factor, and if said time-out is not a spurious time-out, said smoothed average is updated as the product of said stored value of said smoothed average and a predetermined factor.

23. The method of claim 22, wherein said weight factor is equal to 0.5.

24. The method of claim 22, wherein said predetermined factor is associated with a value indicative of the number of data units sent per cycle.

25. The method of claim 24, wherein said value indicative of the number of data units per cycle is determined on the basis of the slow start threshold.

26. The method of claim 25, wherein said value (M) is determined as $$M=1.5 \cdot ssthresh^2$$

where M represents said value and ssthresh represents the slow start threshold.

27. The method of claim 24, wherein said predetermined factor is equal to $$(1-(K/M)),$$

where M represents said value (M) indicative of the number of data units sent per cycle, and K is a value with $0 \leq K<1$.

28. The method of claim 1, wherein an upper and a lower limit value are set for said parameter.

29. The method of claim 28, wherein said lower limit value is at least the sum of the measured round trip time value and the tick size where the tick size is the smallest period of time that a timing system in said data unit transmitter can resolve.

30. The method of claim 11, wherein an upper and a lower limit value are set for said parameter.

31. The method of claim 30, wherein said lower limit value is at least the sum of the measured round trip time value and the tick size, where the tick size is the smallest period of time that a timing system in said data unit transmitter can resolve.

32. The method of claim 17, wherein an upper and a lower limit value are set for said parameter.

33. The method of claim 32, wherein said lower limit value is at least the sum of the measured round trip time value and the tick size, where the tick size is the smallest period of time that a timing system in said data unit transmitter can resolve.

34. The method of claim 1, wherein the round trip time is measured for every data unit sent by said sender.

35. The method of claim 34, wherein said parameter is calculated each time that a round trip time value is measured.

36. The method of claim 11, wherein the round trip time is measured for every data unit sent by said sender.

37. The method of claim 36, wherein said parameter is calculated each time that a round trip time value is measured.

38. The method of claim 17, wherein the round trip time is measured for every data unit sent by said sender.

39. The method of claim 38, wherein said parameter is calculated each time that a round trip time value is measured.

40. A computer program product directly loadable into the internal memory of a digital computer, comprising software code portions for performing the method of claim 1 when said product is run on a digital computer.

41. A computer program product directly loadable into the internal memory of a digital computer, comprising software code portions for performing the method of claim 11 when said product is run on a digital computer.

42. A computer program product directly loadable into the internal memory of a digital computer, comprising software code portions for performing the method of claim 17 when said product is run on a digital computer.

43. A data unit transmitter arranged for implementing a protocol that provides an acknowledgment feature of sending acknowledgment messages for the correct receipt of data units from the receiver to the sender of a communication, and provides a retransmission time-out feature of retransmitting data units if an acknowledgment does not arrive at the sender within a time-out period, and arranged for determining a parameter associated with said retransmission time-out feature, comprising:

a round trip time measurer arranged for measuring a round trip time value, the round trip time being indicative of the time that passes between the sending of a given data unit and the receipt of the acknowledgment corresponding to said given data unit, and a calculator arranged for calculating a new smoothed round trip time value at least on the basis of a stored smoothed round trip time value and said measured round trip time value, calculating a new mean deviation value indicative of the mean deviation of said round trip time values over time, at least on the basis of a stored mean deviation value said measured round trip time value and said stored smoothed round tip time value, and calculating said parameter at least on the basis of said new smoothed round trip time value and said new mean deviation value, where said calculator is furthermore arranged such that a contribution of said measured round trip time value to said new mean deviation value is different if said measured round trip time value a predetermined threshold that is determined on the basis of said stored smoothed round trip time value, than if said measured round trip time value is larger than said predetermined threshold.

44. A data unit transmitter arranged for implementing a protocol that provides an acknowledgment feature of sending acknowledgment messages for the correct receipt of data units from the receiver to the sender of a communication, and provides a retransmission time-out feature of retransmitting data units if an acknowledgment does not arrive at the sender within a time-out period, and arranged for determining a parameter associated with said retransmission time-out feature, comprising:

a round trip time measurer arranged for measuring a round trip time value, the round trip time being indicative of the time that passes between the sending of a given data unit and the receipt of the acknowledgment corresponding to said given data unit, and a calculator arranged for
      calculating a new smoothed round trip time value least on the basis of a stored smoothed round trip time value, said measured round trip time value, and a first weight factor,
      calculating a new mean deviation value indicative of the mean deviation of said round trip time values over time, at least on the basis of a stored mean deviation value, said measured round trip time value, said stored smoothed round trip time value, and a second weight factor (h), and
      calculating said parameter at least on the basis of said new smoothed round trip time value, said new mean deviation value, and a third weight factor, where said calculator is furthermore arranged such that at least one of said first, second and third weight factors is variable over time.

45. A data unit transmitter arranged for implementing a protocol that provides an acknowledgment feature of sending acknowledgment messages for the correct receipt of data units from the receiver to the sender of a communication, and provides a retransmission time-out feature of retransmitting data units if an acknowledgment does not arrive at the sender within a time-out period, and arranged for determining a parameter associated with said retransmission time-out feature, comprising:

a round trip time measurer arranged for measuring a round trip time value, the round trip time being indicative of the time that passes between the sending of a given data unit and the receipt of the acknowledgment corresponding to said given data unit, and a calculator arranged for
      calculating a new smoothed round trip time value at least on the basis of a stored smoothed round trip time value and said measured round trip time value,
      calculating a new mean deviation value indicative of the mean deviation of said round trip time values over time, at least on the basis of a stored mean deviation value, said measured round trip time value and said stored smoothed round trip time value, and
      calculating said parameter at least on the basis of said new smoothed round trip time value said new mean deviation value, where said calculator is furthermore arranged such that said parameter is also calculated on the basis of a value indicative of the number of spurious time-outs that occurred in said communication between said sender and said receiver.

\* \* \* \* \*